J. COYNE.

Apparatus for Assorting Nails.

No. 6,110.

Reissued Nov. 3, 1874.

WITNESSES

James D. Kay

R R Baelz

INVENTOR

John Coyne by Bakewell & Ken

Attorneys

N. PETERS, PHOTO-LITHOGRAPHER, WASHINGTON, D. C.

UNITED STATES PATENT OFFICE.

JOHN COYNE, OF PITTSBURG, ASSIGNOR TO HIMSELF AND ROBERT CHESSMAN, OF ETNA, PENNSYLVANIA.

IMPROVEMENT IN APPARATUS FOR ASSORTING NAILS.

Specification forming part of Letters Patent No. 139,548, dated June 3, 1873; reissue No. 6,110, dated November 3, 1874; application filed January 30, 1874.

*To all whom it may concern:*

Be it known that I, JOHN COYNE, of Pittsburg, in the county of Allegheny and State of Pennsylvania, have invented a new and useful Improved Method of Assorting Nails; and I do hereby declare the following to be a full, clear, and exact description thereof.

My invention relates to a new and improved nail-assorter, in which the good or headed nails are separated from the headless nails, slivers, and other refuse by means of a longitudinal slot, which retains the former by their heads, and permits the latter to pass through; and it consists in providing such an assorter with an adjustable side, whereby the slot may be suited to any sized nail. Cut nails are made of many sizes, and by this feature of adjustment the assorter is fitted for application to machines for cutting and heading nails and tacks of all the usual sizes.

Heretofore this work has been done by hand, so far as done at all, and the result is that on an average from two to five pounds of imperfect or headless nails, scrap, and cinder are sold with every keg of nails, and in view of the fact that between five and six millions of such kegs are made and sold every year in the United States, and these mainly by one or two cities, the necessity of such an invention in this country alone is sufficiently apparent.

Figure 1:
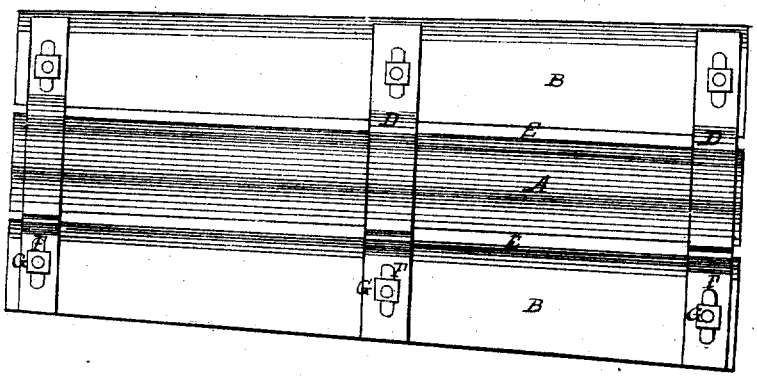
Figure 2:
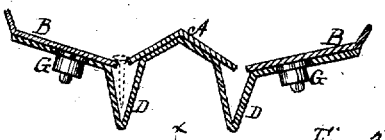
Figure 3:
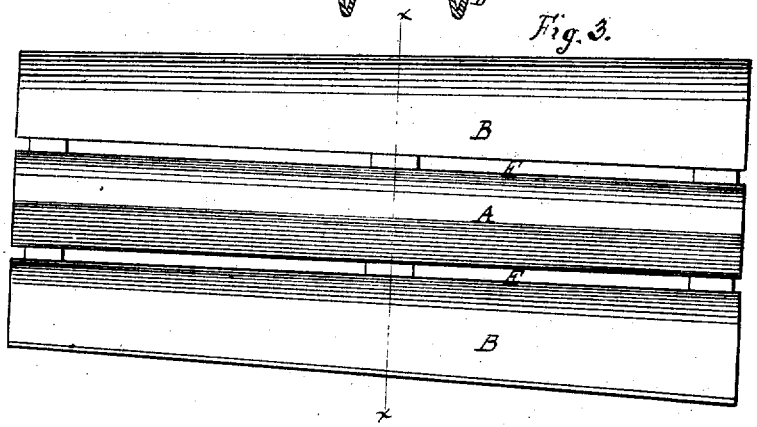

The form of apparatus by which I apply my invention to use is shown in the drawing, in which Figure 1 is a view of the under side of the apparatus. Fig. 2 is a section on *x x*, and Fig. 3 is a plan view.

I mount on two or more cross-braces, D, a center angle-plate, A, and two side plates, B, so as to form two open channels or slots, E. Opposite to the slots E the braces D are bent to permit the free passage of the nails, as shown in Fig. 2, and the ends upon which the plates B are mounted are inclined to give the plates an inclination toward the slots E. To adapt the apparatus to assorting nails and tacks of different sizes, the plates B are adjustable on the braces D by means of the slots F and screws G.

This apparatus is placed in an inclined position in front of the nail-machine with its higher extremity under the point of delivery of the nails from the machine, so that the nails are delivered thereupon. The angle-plate deflects them into the channels, down which the perfect nails ride by their heads, as shown in Fig. 2, to the discharge-point, while the headless nails, scrap, and cinder pass through.

By this method an almost perfect separation of the good nails from the refuse is made.

What I claim as my invention, and desire to secure by Letters Patent, is—

1. A slotted nail-assorter having an adjustable side, whereby the width of the slot may be varied according to the special work to be done, as stated.

2. The combination of the inclined plate B, angle-plate A, and slotted transverse straps with their set-screws, by means of which said plates are made adjustable, as shown and described.

In witness whereof I, the said JOHN COYNE, have hereunto set my hand.

JOHN COYNE.

Witnesses:
T. B. KERR,
JAMES I. KAY.